(12) United States Patent
Rabbani et al.

(10) Patent No.: US 11,640,483 B2
(45) Date of Patent: May 2, 2023

(54) CONFIGURABLE HARDWARE DEVICE

(71) Applicants: KATHOLIEKE UNIVERSITEIT LEUVEN, Leuven (BE); UNIVERSITÀ DEGLI STUDI DI PADOVA, Padua (IT)

(72) Inventors: Md Masoom Rabbani, Diepenbeek (BE); Mauro Conti, Montecastrilli (IT); Nele Mentens, Diest (BE); Jo Vliegen, Hasselt (BE)

(73) Assignees: UNIVERSITÀ DEGLI STUDI DI PADOVA, Padua (IT); KATHOLIEKE UNIVERSITEIT LEUVEN, Leuven (BE)

( * ) Notice: Subject to any disclaimer, the term of this patent is extended or adjusted under 35 U.S.C. 154(b) by 0 days.

(21) Appl. No.: 17/051,526

(22) PCT Filed: Apr. 23, 2019

(86) PCT No.: PCT/EP2019/060382
§ 371 (c)(1),
(2) Date: Oct. 29, 2020

(87) PCT Pub. No.: WO2019/211125
PCT Pub. Date: Nov. 7, 2019

(65) Prior Publication Data
US 2021/0365592 A1 Nov. 25, 2021

(30) Foreign Application Priority Data
Apr. 30, 2018 (GB) .................................. 1806997

(51) Int. Cl.
*G06F 21/76* (2013.01)
*G06F 1/04* (2006.01)
(Continued)

(52) U.S. Cl.
CPC ............... *G06F 21/76* (2013.01); *G06F 1/04* (2013.01); *H04L 9/0877* (2013.01); *H04L 9/3242* (2013.01)

(58) Field of Classification Search
CPC . G06F 21/76; G06F 1/04; G06F 21/57; H04L 9/0877; H04L 9/3242; G01R 31/3185
See application file for complete search history.

(56) References Cited

U.S. PATENT DOCUMENTS 7,366,803 B1 * 4/2008 Gaither ................. H04L 12/433
370/363
9,307,015 B1 * 4/2016 Bauer .................... G06F 3/0649
(Continued)

OTHER PUBLICATIONS

International Search Report and Written Opinion from PCT Application No. PCT/EP2019/060382, dated Jun. 26, 2019.
(Continued)

*Primary Examiner* — Abu S Sholeman
(74) *Attorney, Agent, or Firm* — Workman Nydegger

(57) ABSTRACT

A configurable hardware device comprises a configuration memory of a known total size, and a configurable fabric arranged for being configured according to information from the configuration memory and segmented in a static partition and at least one dynamic partition. A static partition is arranged for receiving a bit stream and a cryptographic nonce and comprises a read/write mechanism for interacting with the configuration memory. The received bit stream is stored in the configuration memory and used to configure an intended application in the dynamic partition. The static partition is arranged for computing, based on the cryptographic nonce, a checksum of the entire configuration memory and for outputting the checksum.

11 Claims, 4 Drawing Sheets

(51) Int. Cl.
   *H04L 9/08* (2006.01)
   *H04L 9/32* (2006.01)

(56) References Cited

U.S. PATENT DOCUMENTS

| | | | | |
|---|---|---|---|---|
| 10,503,792 | B1* | 12/2019 | Frieder | G06F 12/0871 |
| 2003/0217247 | A1* | 11/2003 | Abramovitz | G06F 11/0727 |
| | | | | 711/173 |
| 2005/0005077 | A1* | 1/2005 | Heinrich | G06F 21/572 |
| | | | | 711/154 |
| 2013/0304994 | A1* | 11/2013 | Koob | G06F 12/0842 |
| | | | | 711/129 |
| 2014/0043059 | A1* | 2/2014 | Speers | H03K 19/003 |
| | | | | 326/9 |
| 2014/0052815 | A1* | 2/2014 | Haider | H04L 67/2871 |
| | | | | 709/217 |
| 2017/0178713 | A1* | 6/2017 | Perego | G11C 11/40618 |
| 2018/0004444 | A1* | 1/2018 | Murray | G06F 3/0629 |
| 2018/0026849 | A1* | 1/2018 | Guim Bernat | G06F 16/2379 |
| | | | | 709/223 |
| 2018/0054359 | A1* | 2/2018 | Abel | H04L 41/0806 |
| 2018/0351754 | A1* | 12/2018 | Wallrabenstein | H04L 9/085 |

OTHER PUBLICATIONS

Chaves et al., "On-The-Fly Attestation of Reconfigurable Hardware", 2008 International Conference on Field Programmable Logic and Applications, Heidelberg, Sep. 8-10, 2008, pp. 71-76, https://ieeexplore.ieee.org/abstract/document/4629910.

Choi et al., "Proactive Code Verification Protocol in Wireless Sensor Network", Computational Science and Its Applications—ICCSA 2007, International Conference, Kuala Lumpur, Malaysia, Aug. 26-29, 2007, pp. 1085-1096.

Drimer et al., "A Protocol for Secure Remote Updates of FPGA Configurations", ARC '09: Proceedings of the 5th International Workshop on Reconfigurable Computing: Architectures, Tools and Applications, Mar. 1, 2009, pp. 50-61.

Feller et al., "TinyTPM: A Lightweight Module aimed to IP Protection and Trusted Embedded Platforms", 2011 IEEE International Symposium on Hardware-Oriented Security and Trust, Jun. 5, 2011, pp. 6-11.

Search Report from the corresponding GB Application No. GB1806997.1, dated Nov. 16, 2018.

* cited by examiner

CONFIGURABLE HARDWARE DEVICE

FIELD OF THE INVENTION

The present invention is generally related to the field of configurable hardware devices.

BACKGROUND OF THE INVENTION

Configurable hardware devices have gained increasing popularity in the last decades, for example with the wide adoption of Field-Programmable Gate Arrays (FPGAs). FPGAs are silicon chips that can be configured after fabrication. They provide embedded systems with a higher performance per consumed energy unit than general-purpose microprocessors, while offering configurability after deployment. In comparison to Application-Specific Integrated Circuits (ASICs), FPGA applications have a shorter time to market and can be designed with a lower non-recurring engineering cost. The high-volume production of FPGAs makes it possible for the vendors to closely follow the latest technology nodes at a reasonable cost. Furthermore, the continuous efforts in the past decades to integrate application-specific building blocks, close the performance gap with ASICs. Thanks to these evolutions, the popularity of FPGAs in embedded systems is growing.

The basic structure of the configurable hardware devices, e.g. FPGAs, as considered in the present invention is briefly repeated. The configurable hardware device comprises a configurable fabric which gets its configuration from a configuration memory, as shown in FIG. 1. Through this configuration the functionality of the configurable fabric is determined. The data stored in the configuration memory is referred to as the bit stream. The configuration memory can be (volatile) SRAM or (non-volatile) flash memory. SRAM-based FPGAs are the most frequently applied type of FPGAs.

The basic building blocks of the configurable fabric are: one or more configurable logic circuits comprising combinatorial logic and distributed storage elements, embedded memory blocks providing centralized memory, blocks arranged for input/output operations and connecting the internal hardware to the external environment through the pins of the device and switch matrices to interconnect the building blocks to each other. The actual functionality of the configurable hardware design is configured on the logic circuits and the embedded memory. All the building blocks are configured by the bits in the configuration memory. FPGAs also contain other dedicated hardware primitives, which may be used in combination with the above-described building blocks.

A configurable hardware device like an FPGA can be logically partitioned, which implies that the configurable fabric is segmented in two or more partitions. These partitions can be configured separately while the other partitions continue to operate normally. The part of the configuration memory that configures a specific partition is then updated at run-time through a bit stream of which the size is proportional to the partition size. This is referred to as partial reconfiguration.

The configuration memory of FPGAs is not only accessible from the outside of the FPGA, but also from the configurable fabric inside the FPGA. This is achieved through a dedicated read/write mechanism. When dealing with multiple partitions, one partition usually stays unchanged and contains the read/write mechanism together with control logic. This partition is referred to as the static partition. Typically, the configuration of the static partition is loaded from an on-board non-volatile flash memory into the (volatile) SRAM-based configuration memory when the power is turned on.

Next to the static partition, there can be one or more run-time configurable partitions, which are referred to as dynamic partitions. This is shown in FIG. 2, in which the read/write mechanism is used to write a bit stream into the part of the configuration memory connected to the dynamic partition. This results in the reconfiguration of the dynamic partition. In FIG. 2 a Xilinx FPGA scheme is shown by way of example. In such a FPGA the read/write mechanism is a dedicated primitive called Internal Configuration Access Port (ICAP). In principle, the read/write mechanism is capable of updating the entire configuration memory, including the static partition. Nevertheless, this setting is rarely used in practice, because the control logic in the static partition that interacts with the read/write mechanism should not be changed.

Considering applications in which (un)intended faults occur in the configuration memory, the readback capabilities of the mechanism can be used for error detection and correction. This is important in e.g., space applications, in which Single Event Upsets cause bit flips in the configuration memory. The configuration memory readback mechanism allows reading out the entire configuration memory.

A typical FPGA-based embedded system combines a general-purpose microprocessor with configurable hardware. For the microprocessor, several techniques have been proposed to verify that it is running the intended software application. Attestation of a device or system is a procedure to verify whether an embedded device/system is running the intended application code. This way, protection against both physical attacks and remote attacks on the embedded software can be provided. Many attestation mechanisms for microprocessors rely on a tamper-resistant hardware module. Assuming that this tamper-resistant hardware module itself can be remotely reconfigured, a hardware prover core needs to be able to prove its own state to a verifier, i.e., the configurable hardware needs to perform self-attestation. This is shown in FIG. 3, where μP and TR HW indicate the microprocessor and the tamper-resistant hardware module, respectively. The figure illustrates the traditional adversary model, in which the adversary is assumed to be capable of changing the software code in the processor.

In general, attestation is a challenge-response protocol between a verifier and an untrusted prover. Through attestation, the verifier determines the "health" of the prover. In a typical attestation protocol, the prover sends a cryptographic checksum of its current state upon request of the verifier. Based on the received checksum, the verifier determines if the prover is operating in the intended state. In order to ensure the freshness of the response, a cryptographic nonce (i.e. an arbitrary number that can only be used once) generated by the verifier is included in the checksum.

Various methods have been proposed in the art to perform remote attestation. Roughly speaking, these methods can be divided in three categories: software-based attestation, hardware-based attestation and hybrid techniques which employ minimal hardware support.

In general, most of the software-based attestation mechanisms do not require hardware support and rely on a challenge-response protocol. Typically, in software-based attestation methods, a verifier (Vrf) sends a challenge to a prover (Prv) (device). The Prv computes the cryptographic checksum of its own memory or underlying software along with the challenge provided by the Vrf and sends it back to the Vrf. Based on the received response, the Vrf verifies the "state" of the Prv. Interesting to software-based attestation schemes is their easy and low-cost "hardware-less" approach. However, most of the schemes have flaws or are not practical due to strict timing constraints, due to the absence of data memory attestation and/or due to the lack of protection of stored secrets when the node is compromised.

Hardware-based attestation methods predominantly rely on the use of specialized hardware. For example, Arbaugh et al. propose in "*A secure and reliable bootstrap architecture*" (Proceedings 1997 IEEE Symposium on Security and Privacy, May 1997) an architecture to ensure the integrity of the prover. A list of security checks on the BIOS is performed from power-on until the kernel is loaded. Failure of any of these checks will reboot the prover and bring it back to a known saved state.

Hybrid attestation schemes employ software/hardware co-design that facilitates effective, low-cost, secure solutions without a dedicated hardware module (e.g., a TPM) to thwart the inefficiency of software based-attestation schemes. The goal of hybrid architectures is to provide more security to the attestation schemes against all adversaries except for physical adversaries.

In the art solutions for attesting a device have been proposed wherein the processor platform is assumed to contain a small amount of immutable read-only memory (ROM) that stores a basic program, taking care of communication and memory read/write. More in particular, the immutable ROM takes care of receiving code updates and writing them to the device's memory, and of reading out the checksum and sending it back to the verifier. Configurable hardware devices like FPGAs, however, do not have the possibility of directly storing and accessing their basic program/functionality in an immutable piece of ROM. Since this basic functionality is stored in configurable memory, it is not possible to transpose such a solution directly to FPGAs.

In the paper "*A Protocol for Secure Remote Updates of FPGA Configurations*" (S. Drimer et al., Int'l Workshop on Applied Reconfigurable Computing, ARC2009, Reconfigurable Computing: Architectures, Tools and Applications, pp. 50-61, March 2009) a protocol is presented that provides for remote attestation of the running configuration and the status of the upload process. However, the bit stream is stored in a non-volatile memory and the configuration memory is assumed to be tamper-proof.

In the paper "*On-the-Fly Attestation of Reconfigurable Hardware*" (R. Chaves et al., Int'l Conf. on Field Programmable Logic and Applications, FPL2008, September 2008, pp. 71-76) on-the-fly attestation is performed of hardware structures loaded to reconfigurable devices. Given that a loadable hardware structure to a reconfigurable device is described by a binary bit stream, the hash value of this bit stream can be calculated to validate the hardware structure. The attestation core implemented in the FPGA is assumed tamper-proof, as the core is supposed to make sure that partial configuration updates can only take place in a predetermined restricted area.

In US2014/043059 a method is disclosed for verifying that data is correctly loaded into an individual programmable logic device. A reference digest of the data to be loaded into the individual programmable logic device is computed and the data is loaded. Next, inside the individual programmable logic device an as-programmed digest of the loaded data is computed, read out and compared with the reference. However, no mechanism is provided to guarantee the freshness of the configuration, hence replay attacks are possible. Further, in order for the proposed approach to be operable the FPGA is supposed to have secure key storage.

Hence, there is a need for a solution for hardware-based attestation in case a configurable hardware device is used and no tamper-resistant hardware module is available.

SUMMARY OF THE INVENTION

It is an object of embodiments of the present invention to provide for a configurable hardware device suitable for hardware-based self-attestation.

The above objective is accomplished by the solution according to the present invention.

In a first aspect the invention relates to a configurable hardware device comprising
a configuration memory of a known total size,
a configurable fabric arranged for being configured according to information from said configuration memory and segmented in a static partition and at least one dynamic partition, said static partition arranged for receiving a bit stream and a cryptographic nonce and comprising a read/write mechanism for interacting with said configuration memory, whereby said received bit stream is stored in said configuration memory and used to configure an intended application in said dynamic partition, and whereby said static partition is arranged for computing, based on said cryptographic nonce, a checksum of the entire configuration memory and for outputting said checksum.

The proposed solution indeed allows for self-attestation of the configurable device. The received bit stream is used to configure the intended application and thereby overwrites all prior code. The device then calculates the checksum using the received cryptographic nonce. The checksum is then sent back to the verifier. The proposed architecture does not require the use of external memory for storage of the received bit stream. Therefore it is not needed to rely on a tamper-proof connection between prover and the configurable hardware device. The proposed architecture of the configurable hardware device can readily be implemented on e.g. an off-the-shelf FPGA.

In a preferred embodiment the configuration memory comprises a part corresponding to the static partition and one or more parts corresponding to the at least one dynamic partition.

Preferably the configurable fabric comprises a register to store the nonce. In certain embodiments the configurable fabric comprises a separate partition for the nonce.

In embodiments of the invention the configuration memory is volatile. The part of the configuration memory corresponding to the static partition is in some embodiments arranged for being loaded from an external non-volatile memory. This may be done at power-on.

In another embodiment the configuration memory is non-volatile.

Advantageously the bit stream comprises an algorithm for computing the checksum.

In a preferred embodiment the configurable hardware device comprises a Message Authentication Code core to compute the checksum.

In one embodiment the configurable hardware device comprises an Ethernet core as an external communication link.

In an embodiment the static partition comprises a physically unclonable function circuit to generate a key for use in the computation of said checksum.

In another embodiment at least one dynamic partition of the at least one dynamic partition comprises a physically unclonable function circuit to generate a key for use in the computation of the checksum.

Advantageously, the configurable hardware device comprises a digital clock manager for generating a clock signal for the read/write mechanism. The static partition comprises a receive part arranged to receive external data using a receive clock derived from the received data.

In an embodiment the configurable hardware device is a field programmable gate array.

For purposes of summarizing the invention and the advantages achieved over the prior art, certain objects and advantages of the invention have been described herein above. Of course, it is to be understood that not necessarily all such objects or advantages may be achieved in accordance with any particular embodiment of the invention. Thus, for example, those skilled in the art will recognize that the invention may be embodied or carried out in a manner that achieves or optimizes one advantage or group of advantages as taught herein without necessarily achieving other objects or advantages as may be taught or suggested herein.

The above and other aspects of the invention will be apparent from and elucidated with reference to the embodiment(s) described hereinafter.

BRIEF DESCRIPTION OF THE DRAWINGS

The invention will now be described further, by way of example, with reference to the accompanying drawings, wherein like reference numerals refer to like elements in the various figures.

DETAILED DESCRIPTION OF ILLUSTRATIVE EMBODIMENTS

Figure 1:
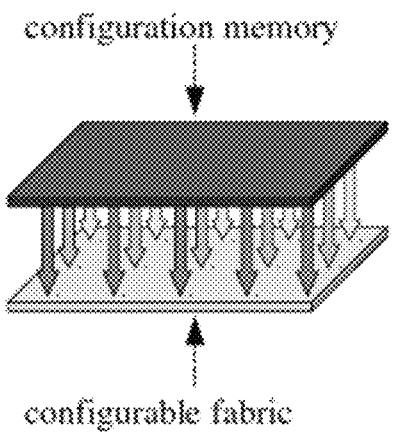
FIG. 1 illustrates the basic structure of a configurable hardware device as known in the art.
Figure 2:
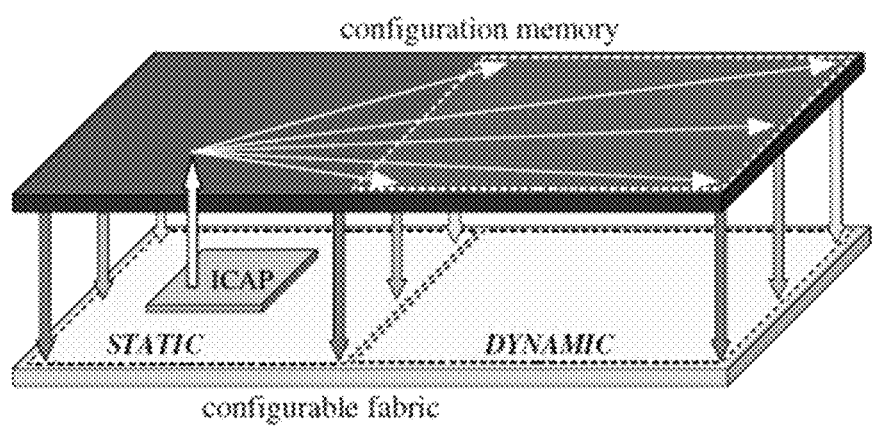
FIG. 2 illustrates the read/write mechanism reading back the configuration of the entire configuration memory.
Figure 3:
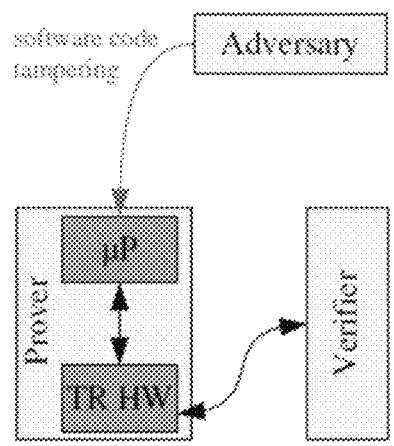
FIG. 3 illustrates an adversary model in a conventional hardware-based attestation setting.

The present invention will be described with respect to particular embodiments and with reference to certain drawings but the invention is not limited thereto but only by the claims.

Furthermore, the terms first, second and the like in the description and in the claims, are used for distinguishing between similar elements and not necessarily for describing a sequence, either temporally, spatially, in ranking or in any other manner. It is to be understood that the terms so used are interchangeable under appropriate circumstances and that the embodiments of the invention described herein are capable of operation in other sequences than described or illustrated herein.

It is to be noticed that the term "comprising", used in the claims, should not be interpreted as being restricted to the means listed thereafter; it does not exclude other elements or steps. It is thus to be interpreted as specifying the presence of the stated features, integers, steps or components as referred to, but does not preclude the presence or addition of one or more other features, integers, steps or components, or groups thereof. Thus, the scope of the expression "a device comprising means A and B" should not be limited to devices consisting only of components A and B. It means that with respect to the present invention, the only relevant components of the device are A and B.

Reference throughout this specification to "one embodiment" or "an embodiment" means that a particular feature, structure or characteristic described in connection with the embodiment is included in at least one embodiment of the present invention. Thus, appearances of the phrases "in one embodiment" or "in an embodiment" in various places throughout this specification are not necessarily all referring to the same embodiment, but may. Furthermore, the particular features, structures or characteristics may be combined in any suitable manner, as would be apparent to one of ordinary skill in the art from this disclosure, in one or more embodiments.

Similarly it should be appreciated that in the description of exemplary embodiments of the invention, various features of the invention are sometimes grouped together in a single embodiment, figure, or description thereof for the purpose of streamlining the disclosure and aiding in the understanding of one or more of the various inventive aspects. This method of disclosure, however, is not to be interpreted as reflecting an intention that the claimed invention requires more features than are expressly recited in each claim. Rather, as the following claims reflect, inventive aspects lie in less than all features of a single foregoing disclosed embodiment. Thus, the claims following the detailed description are hereby expressly incorporated into this detailed description, with each claim standing on its own as a separate embodiment of this invention.

Furthermore, while some embodiments described herein include some but not other features included in other embodiments, combinations of features of different embodiments are meant to be within the scope of the invention, and form different embodiments, as would be understood by those in the art. For example, in the following claims, any of the claimed embodiments can be used in any combination.

It should be noted that the use of particular terminology when describing certain features or aspects of the invention should not be taken to imply that the terminology is being re-defined herein to be restricted to include any specific characteristics of the features or aspects of the invention with which that terminology is associated.

In the description provided herein, numerous specific details are set forth. However, it is understood that embodiments of the invention may be practiced without these specific details. In other instances, well-known methods, structures and techniques have not been shown in detail in order not to obscure an understanding of this description.

The present invention discloses a configurable hardware device, e.g. an FPGA, arranged for performing self-attestation. This way the hardware device (the FPGA) can be used as a trusted hardware module in hardware-based attestation schemes. These schemes usually rely on the presence of a trusted tamper-resistant dedicated hardware module. The invention allows configurable devices like FPGAs, which are configurable after deployment and thus inherently not tamper-resistant, to be used inside these trusted hardware modules.

More in particular, the invention aims to propose a solution wherein a prover core on a configurable hardware device is arranged to perform an attestation of the entire device, including a self-attestation. This way, the device can be used to perform hardware-based attestation of a processor that is either embedded in or externally connected to the device, resulting in a protection of the entire hardware/software system against malicious code updates.

The attestation mechanism relies on proofs of secure erasure. When the verifier sends data or code to the prover that fills the entire (limited) memory of the prover's embedded device, this implies that all prior code is overwritten and thus erased. This way, the goal is not to detect the presence of malicious code, but to make sure there is no malicious code remaining after the code erasure/update. Secure code updates can then be performed to ensure that the memory/state of an embedded device is updated. The device can then compute the cryptographic checksum of the entire memory content and send it back to the verifier. The algorithm for the computation of the checksum can be included in the code that is sent by the verifier as part of the protocol. Alternatively, it can be contained in the static partition of the device. In the approach according to the invention the attestation challenge and the nonce correspond to the code that is sent by the verifier to fill the entire memory of the configurable device wherein the prover is implemented. The verifier is assumed to know the exact size of the configuration memory in this approach.

The configurable hardware device according to the invention overcomes the challenges that occur due to the differences between embedded processor platforms and configurable HW devices like FPGAs. The resulting architecture uses partial reconfiguration and configuration memory read-back (already briefly explained in the background section) to make sure that it does not contain malicious hardware modules. This way, the configurable device can perform self-attestation, which is crucial for hardware-based attestation solutions that use such a device as the trusted hardware module.

The proposed solution improves the security of configurable hardware device based attestation methods. From the observation that the trusted hardware module itself needs to be verified when it is based on configurable hardware (e.g., an FPGA), an architecture and attestation protocol are proposed. This allows the self-attestation of the configurable hardware module, such that the device can be trusted by the verifier when it is used for the hardware-based attestation of the software running on a processor. Although the focus is on the self-attestation of the configurable device and not on the connection of the trusted module with a processor, the device according to this invention can easily be combined with existing hardware-based attestation mechanisms.

In the device of the invention the configuration memory of the configurable hardware device is assumed to have a known size. Further, one relies on the observation that there is not enough memory in the configurable fabric to store the configuration data sent by the verifier, so it is sure the configuration data is stored in the configuration memory. This automatically implies that the configurable structure is running the application contained in the stored configuration. An architecture is proposed that makes use of partial reconfiguration. The static partition of the configurable HW device is referred to as StatPart and each dynamic partition as a DynPart. The configuration memory for StatPart is denoted StatMem and that for the DynPart is DynMem. In the proposed solution the communication with the verifier and the read/write mechanism to access the configuration memory are implemented in the StatPart. The code updates are applied to the DynMem, which has a known size. A cryptographic checksum is computed on the entire configuration memory, including the StatMem.

Figure 4:
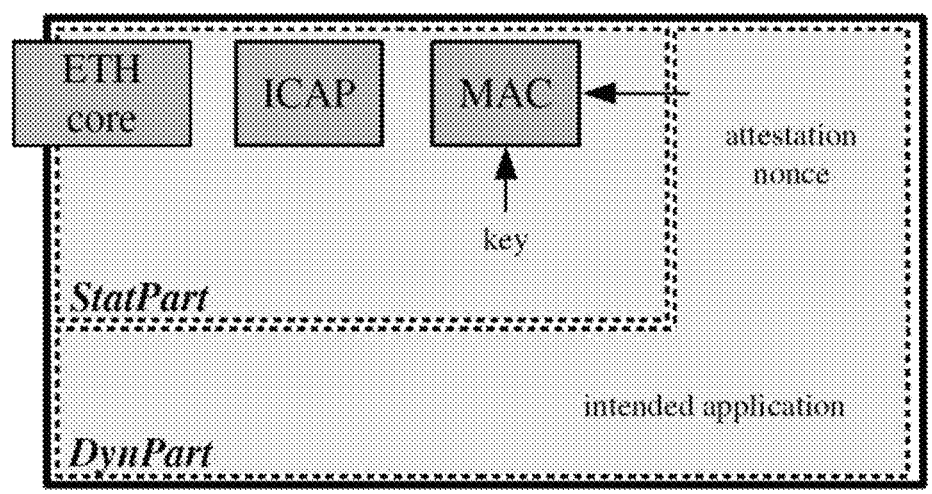
FIG. 4 illustrates a high-level overview of the architecture of the device of this invention.

FIG. 4 gives a high-level overview of the FPGA architecture. In the StatPart the read/write mechanism (ICAP) takes care of writing the configuration memory in order to (re)configure the DynPart. It is also used for reading out the entire configuration memory, which contains both StatMem and DynMem. Further, the Ethernet (ETH) core provides a communication link with the verifier. The Message Authentication Code (MAC) core computes the cryptographic checksum of the entire configuration memory content. The MAC guarantees that the checksum is computed by the configurable HW device and not by another device impersonating that device. This is achieved by a shared key between the prover and the verifier. The MAC also guarantees that the configuration data are not tampered with.

Figure 5A:
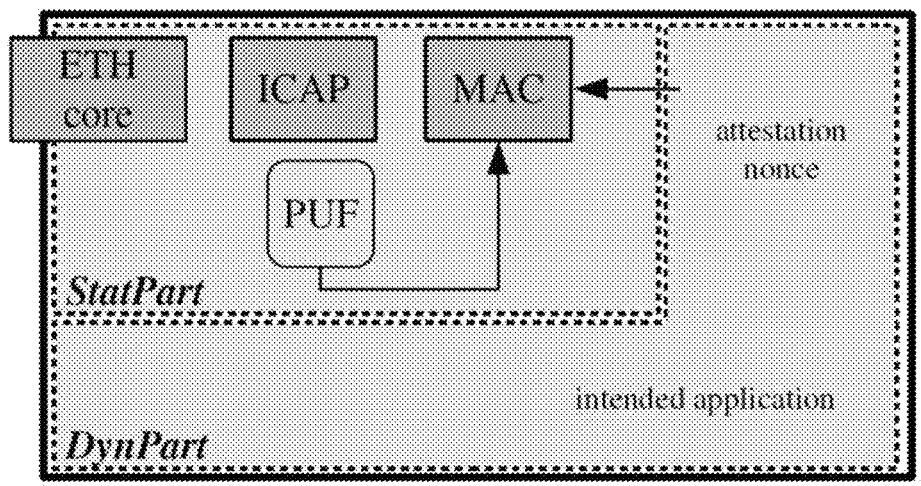
FIGS. 5a and 5b illustrate two possible options for storing a key for the MAC.
Figure 5B:
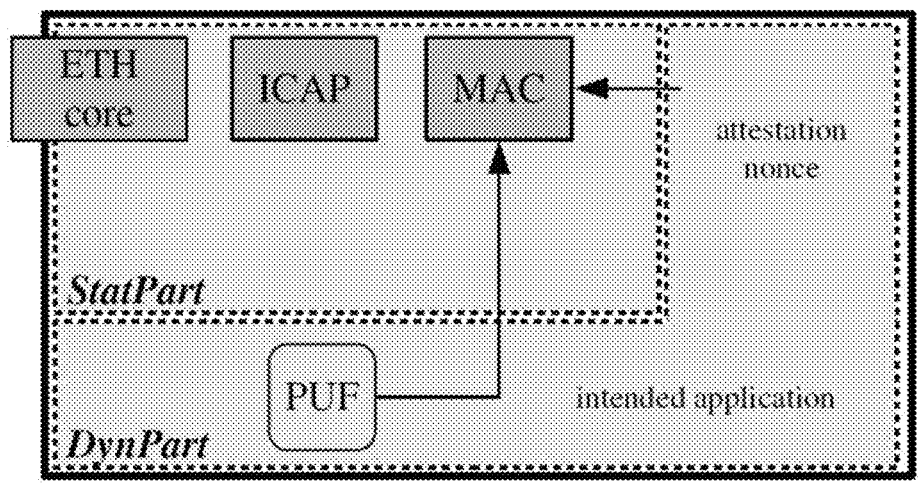

Various options are available for storing said key for the MAC in the device. One option is to implement a (weak) Physical(ly) Unclonable Function (PUF) in the StatPart that generates the key. Even if the adversary has access to the PUF circuit in the StatMem, the key cannot be retrieved to clone the device. This option is illustrated in FIG. 5a. Another option is to include a PUF in the DynPart as a new hardware module from the verifier as part of the attestation protocol (see FIG. 5b). This allows the verifier to update the shared key by updating the PUF circuit. In this case, each PUF circuit sent by the verifier needs to have gone through an enrollment phase before the deployment of the configurable HW device.

The static partition (StatPart) needs to be configured and running on the configurable device at all time. If the configurable hardware device is SRAM-based, the configuration memory is volatile. This means that the static configuration needs to be loaded from a non-volatile memory every time the power of the device is turned on. Therefore, in some embodiments the configurable HW device is arranged for being connected to a small non-volatile memory (e.g. a Flash memory) to load the StatMem of the configurable device at power-on. This non-volatile memory is hereafter called BootMem. In one aspect the invention also relates to a system comprising a configurable HW device as previously described wherein also such a small non-volatile memory (e.g. a Flash memory) is provided. The size of the BootMem is minimized, such that it is not capable of storing the configuration bit stream of the DynPart. As already said, the dynamic configuration bit stream can only be stored in the configuration memory. In order to achieve a minimum-size static configuration bit stream and thus a minimum-size BootMem, the area of the StatPart is made as small as possible, and definitely significantly smaller than the area of the DynPart. Note that, on commercial FPGA boards, it is only possible to program the BootMem by decoupling it from the board and connecting it to a programming device. This means that, even if the BootMem was capable of storing the full bit stream of the FPGA, it would still not be possible to store the dynamic bit stream sent remotely by the prover. So it can safely be assumed that the bit stream sent by the verifier can only be stored in the configuration memory.

The dynamic partition (DynPart) contains the intended configuration of the configurable device and a register that stores a nonce, i.e., an arbitrary number that can only be used once. The nonce can be updated by the verifier in order to achieve freshness when requesting a MAC from the prover. Optionally, the dynamic partition contains a PUF for key generation. In practice, the use of a separate partition is preferable for the nonce, such that the nonce can be updated without updating the intended application in the DynPart.

This way, the verifier can request a fresh checksum of the prover's configuration without changing the intended application.

Figure 6:
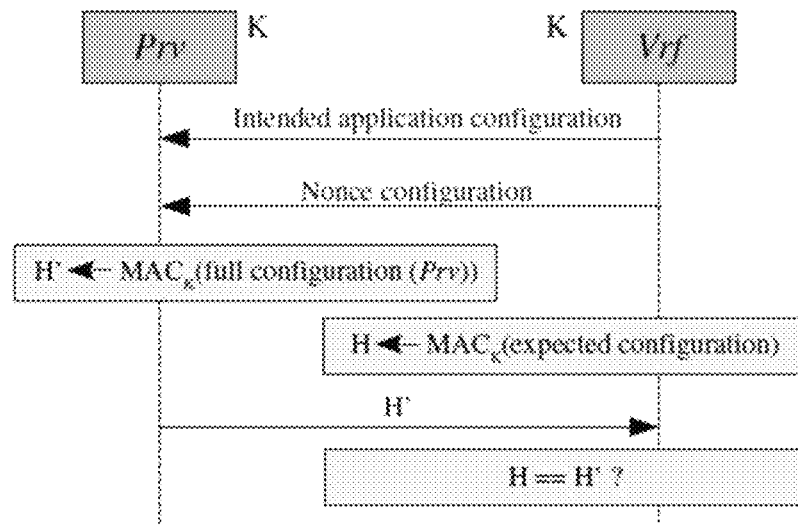
FIG. 6 illustrates the proposed protocol.

FIG. 6 shows the attestation protocol applied between verifier and prover. The device with the proposed architecture is on the prover side. First, the verifier sends a configuration bit stream to the prover, which stores the bit stream in the configuration memory through the read/write mechanism (e.g. ICAP). The architecture facilitates the independent configuration of the intended application and the nonce. Therefore, the dynamic configuration is performed in two steps, as shown in FIG. 6. After the two configuration steps, the entire dynamic configuration memory is (over)written by the verifier. Even if the intended application and the nonce register do not need all the resources in the configurable fabric of the dynamic partition, the dynamic bit stream still fills the entire dynamic configuration memory. Optionally, the bit stream that configures the intended application also contains configuration data for the key-generating PUF.

When the bit stream is written into the configuration memory, the configurable device runs the intended application, which contains a register that stores the received nonce. To prove this to the verifier, the entire configuration memory is read out by the read/write mechanism. A MAC is generated and sent back to the verifier, which generates the same MAC using the shared key and compares the two values to verify the internal configuration of the entire device.

Figure 7:
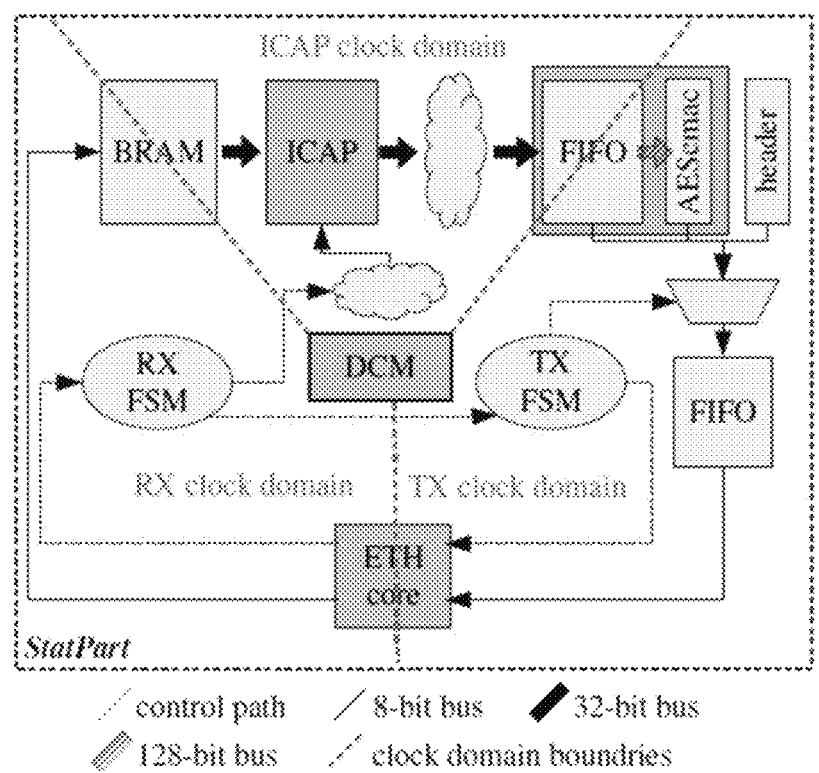
FIG. 7 illustrates a possible implementation of the static partition in the device of the invention.

The high-level view of the proposed architecture was given in FIG. 4. A block diagram of an implementation of the static partition StatPart according to an embodiment of the invention is shown in FIG. 7. Again, a Xilinx FPGA scheme is considered by way of example. The StatPart is divided into three parts that each operate in a different clock domain:

- the receive (RX) clock domain for receiving data from the verifier: the RX clock is derived from the incoming network packets; it runs at 125 MHz and drives the receiving port of the Ethernet (ETH) core and the other components in the RX domain
- the clock domain of the mechanism (ICAP in this particular case) for reading and writing data from/to the configuration memory: the ICAP clock is generated by the Digital Clock Manager (DCM); it runs at 100 MHz and drives the ICAP and the other components in the ICAP domain
- the transmit (TX) clock domain for transmitting data to the verifier: the TX clock is generated by the Digital Clock Manager (DCM); it runs at 125 MHz and drives the transmitting port of the ETH core and the other components in the TX domain The DCM is a clock synthesizer that derives the TX clock and the ICAP clock from the on-board 200 MHz system clock. Note that the RX and TX clocks run at the same frequency. They cannot originate from the same clock source, though, since there might be a phase shift between the incoming and outgoing network packets. The role of the components in the three domains is explained below. The clouds between two components in FIG. 7 provide glue logic that translates the signals coming from one component to the format expected by the other component. The ETH core provides a Gigabit network connection by receiving/transmitting one byte per cycle of the 125 MHz clock.

In the RX clock domain the incoming network packets from the verifier are received by the ETH core. The network packets are stored in the BRAM-based memory. The Finite State Machine of the RX clock domain (RX FSM) either triggers the glue logic in the TX clock domain to initiate the running of the ICAP program or triggers the Finite State Machine of the TX clock domain (TX FSM) to transmit a network packet back to the verifier.

In the ICAP clock domain the command stored in the BRAM-based memory is executed by the ICAP. In case the stored command is ICAP config, the ICAP takes the configuration frame that is also stored in the BRAM, and writes it to the configuration memory. In case the stored command is ICAP readback, the frames read out by the ICAP are stored in a FIFO, which can be read out in the TX clock domain.

In the TX clock domain the outgoing network packets are generated. First, the packet header is loaded into a FIFO queue. Then, either a frame is loaded into the FIFO (by copying the content from the preceding FIFO) or the checksum generated by the MAC block (through the AES-CMAC algorithm) is loaded into the FIFO. The content of the FIFO is transmitted to the verifier by the ETH core. If a 128-bit AES for the AES-CMAC algorithm is used, a 128-bit key needs to be stored/generated.

In the implementation of FIG. 7, a key register in the StatPart is used to store the key. For a foolproof solution, a key-generating PUF needs to be implemented instead of the key register.

Compared to e.g. the above-mentioned disclosure of US2014/043059 the approach according to the present invention offers several advantages. The proposed protocol makes use of a cryptographic nonce and the various configuration frames are sent in a random order. Hence, the hash value calculated by the FPGA is also based on said random order. As opposed to US2014/043059 there is in the invention no need to assume a secure key storage, as a PUF is provided in the configuration. As already mentioned previously, providing the PUF in the DynPart of the FPGA allows an update of the PUF and hence also an update of the shared key.

While the invention has been illustrated and described in detail in the drawings and foregoing description, such illustration and description are to be considered illustrative or exemplary and not restrictive. The foregoing description details certain embodiments of the invention. It will be appreciated, however, that no matter how detailed the foregoing appears in text, the invention may be practiced in many ways. The invention is not limited to the disclosed embodiments.

Other variations to the disclosed embodiments can be understood and effected by those skilled in the art in practicing the claimed invention, from a study of the drawings, the disclosure and the appended claims. In the claims, the word "comprising" does not exclude other elements or steps, and the indefinite article "a" or "an" does not exclude a plurality. A single processor or other unit may fulfil the functions of several items recited in the claims. The mere fact that certain measures are recited in mutually different dependent claims does not indicate that a combination of these measures cannot be used to advantage. A computer program may be stored/distributed on a suitable medium, such as an optical storage medium or a solid-state medium supplied together with or as part of other hardware, but may also be distributed in other forms, such as via the Internet or other wired or wireless telecommunication systems. Any reference signs in the claims should not be construed as limiting the scope.

The invention claimed is:

1. A configurable hardware device comprising:
a configuration memory of a known total size,
a configurable fabric arranged for being configured according to information from said configuration memory and segmented in a static partition and at least two dynamic partitions including a first dynamic partition and a second dynamic partition, said static partition arranged for receiving a bit stream and a cryptographic nonce and comprising a read/write mechanism for interacting with said configuration memory,
wherein said received bit stream is stored in said configuration memory and is used to configure an intended application in said first dynamic partition, the second dynamic partition being different from said first dynamic partition, the second partition comprising a register to store said cryptographic nonce,
wherein said static partition is arranged for computing, based on said cryptographic nonce, a checksum of the entire configuration memory, including said static partition and said at least two dynamic partitions, and for outputting said checksum, and
wherein said configuration memory comprises a part corresponding to said static partition and one or more parts corresponding to said at least two dynamic partition.

2. The configurable hardware device as in claim 1, wherein said configuration memory is volatile.

3. The configurable hardware device as in claim 2, wherein said part of said configuration memory corresponding to said static partition is arranged for being loaded from an external non-volatile memory.

4. The configurable hardware device as in claim 1, wherein said bit stream comprises an algorithm for computing said checksum.

5. The configurable hardware device as in claim 1, comprising a Message Authentication Code core to compute said checksum.

6. The configurable hardware device as in claim 1, comprising an Ethernet core as an external communication link.

7. The configurable hardware device as in claim 1, wherein said static partition comprises a physically unclonable function circuit to generate a key for use in the computation of said checksum.

8. The configurable hardware device as in claim 1, wherein at least one dynamic partition of said at least two dynamic partition comprises a physically unclonable function circuit to generate a key for use in the computation of said checksum.

9. The configurable hardware device as in claim 1, comprising a digital clock manager for generating a clock signal for said read/write mechanism.

10. The configurable hardware device as in claim 9, wherein said static partition comprises a receive part arranged to receive external data using a receive clock derived from said received data.

11. The configurable hardware device as in claim 1, wherein the configurable hardware device is a field programmable gate array.

* * * * *